(12) United States Patent
Anderson

(10) Patent No.: US 6,836,506 B2
(45) Date of Patent: Dec. 28, 2004

(54) SYNCHRONIZING TIMING BETWEEN MULTIPLE AIR LINK STANDARD SIGNALS OPERATING WITHIN A COMMUNICATIONS TERMINAL

(75) Inventor: Jon J. Anderson, Boulder, CO (US)

(73) Assignee: Qualcomm Incorporated, San Diego, CA (US)

( * ) Notice: Subject to any disclaimer, the term of this patent is extended or adjusted under 35 U.S.C. 154(b) by 164 days.

(21) Appl. No.: 10/229,585

(22) Filed: Aug. 27, 2002

(65) Prior Publication Data
US 2004/0042576 A1 Mar. 4, 2004

(51) Int. Cl.⁷ .......................... H04B 1/707; H04L 7/00
(52) U.S. Cl. ..................................... 375/145; 375/365
(58) Field of Search ................................ 375/141, 145, 375/354, 356, 365, 367; 370/208, 320, 335, 350, 342, 441, 503, 509, 514, 515

(56) References Cited

U.S. PATENT DOCUMENTS

| | | | |
|---|---|---|---|
| 5,828,660 A | * 10/1998 | Baum et al. | 370/330 |
| 6,044,074 A | * 3/2000 | Zehavi et al. | 370/350 |
| 6,522,625 B1 | * 2/2003 | Hayashi et al. | 370/208 |

2001/0036200 A1 * 11/2001 Nelson et al. ............... 370/503

* cited by examiner

Primary Examiner—Don N Vo
(74) Attorney, Agent, or Firm—Philip R. Wadsworth; Gregory D. Ogrod (57) ABSTRACT

A system and method for synchronizing a number of specialized circuits or application-specific integrated circuits to a common timing standard is provided. The system includes a first communications device including at least first and second type communication paths which is configured to receive first and second timing signals in the first type communications path and to transmit data on the second type communications path. The data is transmitted in association with the received first timing signal. A controller or signal processor element is coupled to the first device and configured to receive the second timing signal and produce a timing word therefrom. A second communications device is coupled to the processor and configured to receive the second timing signal and produce a timing word therefrom. The second communications. device receives the timing word and the transmitted data and derives synchronization information therefrom. The derived synchronization information is related to the first timing signal. The second communications device performs one or more operations in accordance with the received second timing signal and the derived synchronization information.

22 Claims, 7 Drawing Sheets

SYNCHRONIZING TIMING BETWEEN MULTIPLE AIR LINK STANDARD SIGNALS OPERATING WITHIN A COMMUNICATIONS TERMINAL

BACKGROUND OF THE INVENTION

I. Field of the Invention

The present invention generally relates to wireless communications networks. More particularly, the present invention relates to a method and apparatus for synchronizing timing in circuits associated with wireless communication terminals that support multiple airlinks or multi-mode phones.

II. Related Art

There are presently many different types of radiotelephone or wireless communication systems, including different terrestrial based wireless communication systems and different satellite based wireless communication systems. The different terrestrial based wireless systems can include Personal Communications Service (PCS) and cellular systems. Examples of known cellular systems include the cellular Analog Advanced Mobile Phone System (AMPS), and the following digital cellular systems: Code Division Multiple Access (CDMA) systems; Time Division Multiple Access (TDMA) systems; and newer hybrid digital communication systems using both TDMA and CDMA technologies.

The use of CDMA techniques in a multiple access communication system is disclosed in U.S. Pat. No. 4,901,307, entitled "*Spread Spectrum Multiple Access Communication System Using Satellite Or Terrestrial Repeaters*" and U.S. Pat. No. 5,103,459, entitled "*System And Method For Generating Signal Waveforms In A CDMA Cellular Telephone System*," both of which are assigned to the assignee of the present invention and are incorporated herein by reference.

The method for providing CDMA mobile communications was standardized in the United States by the Telecommunications Industry Association in TIA/EIA/IS-95-A entitled "*Mobile Station-Base Station Compatibility Standard for Dual-Mode Wideband Spread Spectrum Cellular System*," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), cdma2000 (such as cdma2000 1x or 3x standards, for example) or TD-SCDMA.

In the above patents, CDMA techniques are disclosed in which a large number of mobile station users, each having a transceiver, communicate through satellite repeaters or terrestrial base stations. The satellite repeaters are known as gateways and the terrestrial base stations are known as cell base stations or cell-sites. The gateways provide communication links for connecting a user terminal to other user terminals or users of other communications systems, such as a public telephone switching network. By using CDMA communications, the frequency spectrum can be used by multiple terminals thus permitting an increase in system user capacity. The use of CDMA techniques result in much higher spectral efficiency than can be achieved using other multiple access techniques.

In a typical CDMA communications systems, both the remote units and the base stations discriminate the simultaneously received signals from one another using modulation and demodulation of the transmitted data with high frequency pseudo-noise (PN) codes, orthogonal Walsh codes, or both. For example, in the forward link, i.e., base station to mobile station direction, IS-95 separates transmissions for different users from the same base station into different channels by the use of different Walsh codes for each transmission, while the transmissions from different base stations are distinguished by the use of a uniquely offset PN code. In the reverse link, i.e., mobile station to base station direction, different PN sequences are used to distinguish different channels or user terminals.

The forward CDMA link includes a pilot channel, a synchronization (sync)-channel, one or more paging channels, and a larger number of traffic channels. The reverse link includes an access channel and a number of traffic channels. The pilot channel transmits a beacon signal, known as a pilot signal, and is used to alert mobile stations of the presence of a CDMA compliant base station. After a mobile station has successfully acquired the pilot signal, it can then receive and demodulate the sync-channel in order to achieve frame level synchronization and system time, etc. The synch channel carries a repeating message that specifically identifies the base station, provides system level timing, and provides the absolute phase of the pilot signal. This feature will be discussed in greater detail below. The paging channel is used by the base station to assign communication channels and to communicate with the mobile station when it has not been assigned to a traffic channel. Finally, the traffic channels assigned to individual mobile stations are used to carry user communications traffic, such as speech and data.

To communicate properly in a CDMA system, the state of the particular codes selected must be synchronized at the base station and mobile station. Code level synchronization is achieved when the state of the codes at the mobile station system are the same as those in the base station, less some offset to account for processing and transmission delay. In IS-95, such synchronization is facilitated by the transmission of the pilot signal, which comprises the repeated transmission of the uniquely offset PN code (pilot PN code), from each base station. In addition to facilitating synchronization at the Pilot PN code level, the pilot channel allows identification of each base station relative to the other base stations located around it using the pilot channel phase offset. The pilot channel, therefore, provides the mobile station with access to a first level of detailed PN sequence timing information.

Mobile stations initially acquire an IS-95 based communications system by searching for a valid pilot signal within a definable search window. Pilot signals associated with different base stations are distinguished from one another on the basis of the phase (time offset) of the pilot signal. Thus, although each base station transmits an identical pilot signal, pilot signals from different base stations have different phases. A 9-bit number can be used to identify the pilot phase and is called the pilot offset.

After a mobile phone has acquired a valid pilot signal and has associated that pilot signal with a particular base station, the mobile station can receive and demodulate the sync channel. In addition to providing the mobile station with the phase of the pilot signal and identification of its associated base station, the synchronization message also includes CDMA system level timing information. Although system time can be provided through a number of different timing sources, traditional wireless communication systems derive system timing information through the global positioning system (GPS) satellite system located at each base station.

Due in part to convenience and availability of mobile phones, in the United States the Federal Communications Commission (FCC) now requires that wireless communication system (WCS) providers implement a mechanism to automatically route 911 calls to the nearest emergency services processing center. This is referred to as the E911 requirement. In order to accommodate this requirement, the WCS must be able to quickly and accurately determine the geographic position of a mobile phone or wireless device. Conventional WCSs typically determine a user's or mobile station position using what is referred to as either a handset based solution or a network based solution.

The conventionally used handset-based method typically relies on GPS capabilities to provide user position information. This GPS solution, however, exhibits degraded performance and availability in areas where satellite coverage is limited or obscured, such as indoors or in major urban areas. GPS solutions are also relatively slow to provide a position determination and can be costly. Network-based solutions rely on a signal transmitted from the mobile station to multiple fixed base stations. The limitation here, however, is the requirement of multiple base stations. Thus, if a user is in an area with limited base station coverage, providing position information using the network-based solution will be problematic.

Another issue to consider regarding GPS based solutions is that a GPS acquisition device may have a substantial number of search spaces, involving different codes, timing and so forth, to search over. The size of the timing window for the various timing hypothesis needing to be tested to acquire the GPS signal may be significantly large. This requires more time than desired to acquire the signal timing or to perform GPS measurements, and also affects the accuracy of the measurements.

What is needed, therefore, is a system and method to eliminate the shortcomings of the conventionally used position determination techniques. In particular, what is needed is a system and method of implementing a multi-mode dual circuit or ASIC wireless device, that can share accurate time among multiple ASICs. The sharing of system time among signal processing circuits speeds the process of position determination and facilitates the broadcast of system time over the entire WCS network. Also, what is needed is a multi-mode phone constructed and arranged to facilitate the sharing of WCS system time between multiple ASICs within the same mobile phone. A system and method constructed and arranged in this manner can accommodate aspects of both the GPS solution and the network based solution discussed above and provides timely and accurate position data for support of the E911 feature and/or timely intersystem handover, such as CDMA to wideband CDMA (W-CDMA).

SUMMARY OF THE INVENTION

Exemplary embodiments comprise apparatus and methods using a first communications device having at least first and second types of communication paths which is adapted to receive first and second timing signals over the first type communication path and transmit data on the second type communication path. The data is transmitted in association with the received first timing signal. In some embodiments, the first type communication path comprises a forward link and the second type communication path includes a reverse link. The first and second timing signals can comprise pilot and synchronization channel message signals, respectively.

A processor is coupled to the first communications device and is configured to receive a second timing signal and produce a timing word. The timing word can comprise information related for example to adjustments for compensating for path delays. A second communications device having at least the first type of communication path is coupled to the processor and adapted to receive the timing word and the transmitted data and to derive synchronization information. The resulting derived synchronization information is related to the first timing signal, and the processor performs one or more operations in accordance with the received second timing signal and the derived synchronization information. The operations being performed comprise deriving timing information associated with the second communications device. Alternatively, the operations comprise acquiring one or more communications signals in accordance with the received second timing signal and the derived synchronization information. In some embodiments, the one or more communications signals comprise at least a timing signal associated with a positioning satellite network.

In exemplary embodiments, the first and second communications devices comprise first and second application specific integrated circuits.

The apparatus can further comprise a tuner coupled to the processor to receive a number of radio frequency signals based upon a first processor control signal and to produce a selected frequency signal as an output. A first switch coupled to the processor receives a second processor control signal, the selected frequency signal from the tuner, and selectively switches the selected frequency signal between two or more output ports.

In this embodiment, a first circuit is coupled to the processor, the tuner, and the first switch and comprises a first receive path, which can be a forward communications link, coupled to a first switch output port to receive the selected frequency signal. The selected frequency signal comprises a first type of timing component and a synchronization word which is output to the processor which produces a second type timing component in response. The timing component can comprise for example pseudorandom noise level timing information. A time tracking device is configured to receive the first and second timing components, to perform a first synchronization operation in response, and to produce a synchronization point in accordance with the first synchronization operation. A code generator coupled to the processor receives a communications message there from, and generates a data sequence and provides it to the time tracking device which produces a correlated data sequence based upon the synchronization point and the communications message. A first transmit path, which can be a reverse communications link, is configured to receive the correlated data sequence and produce a synchronized data stream and to transmit the synchronized data stream using a first transmit path output port.

A second switch is electrically coupled to the processor and to the first transmit path output port, has two or more second switch output ports and is configured to receive a third processor control signal and the synchronized data stream, and to selectively switch the received synchronized data stream between the two or more second switch output ports. A third switch comprising two third switch input ports and an output port, has a first input port coupled to the second of first switch output ports, and a second switch input port coupled to one of the second switch output ports. The third switch is configured to receive a fourth processor control signal, the selected frequency signal using the first third switch input port, and the synchronized data stream using the second third switch input port.

In this embodimdent, a second circuit is also coupled to the processor and the third switch comprises a second receive path, which can be a forward communications link, having an input coupled to the third switch output port to receive a selected one of the synchronized data stream and the selected frequency signal, and a correlator coupled to an output of the second receive path configured to detect the presence of the synchronized data stream when received and provide the synchronized data stream as an output. A time measurement mechanism has an input coupled to an output of the correlator and another input coupled to the processor, to receive the synchronized data stream from the correlator and the synchronization word from the processor, and to derive a timing window there from.

The method for acquiring a timing signal comprises receiving first and second timing signals, such as a pilot signal and a synchronization channel message, over the first type communications path of a first communications device, transmitting data over the second type communications path of the first communications device, the data being transmitted in association with the received first timing signal. The first type communication path can for example be a forward communications link and the second type communication path can be a reverse communications link. The second timing signal is received in the processor and converted into a timing word. The transmitted data, derived synchronization information, and the timing word are received in the second communications device, and one or more operations are performed in accordance with the received transmitted data and the timing word.

A further embodiment comprises a communication device configured to operate in first and second air link modes, such as those of satellite, CDMA, W-CDMA, and GSM based wireless communication systems, with at least first and second type communication paths adapted for facilitating communication at least during of the first air link mod. The communication device is configured to receive first and second timing signals on the first type communication path, first and second timing signal data respectively representative of the first and second timing signals being stored in a communication device memory, and to transmit communication data on the second type communication path, the communication data being transmitted in accordance with the first timing signal data The second air link mode includes at least a first type communication path configured for facilitating communication with the communication device during operation of the second air link mode, and is configured to receive the transmitted communication data and produce first type synchronization information there from. A timing mechanism is configured to activate during the second air link mode and to receive the first type synchronization information, and a processor coupled to the communication device is configured to receive the second timing signal data stored in the memory and produce second type synchronization information there from, which is provided to the timing mechanism during activation.

Features and advantages of the present invention include the ability to provide a multi-mode dual-chip phone for performing rapid GPS measurements in support of E911. The sharing of WCS system time can not only be accommodated between multiple processing circuits or ASICs but can also be accommodated within a single reconfigurable multi-mode ASIC. The sharing of WCS system time between multiple ASICs and in single re-configurable ASICs enables acquisition of GPS as well as other types of services more quickly and accurately. Finally, sharing of WCS system time minimizes the frequency of call drops due to the mobile phone performing GPS measurements.

BRIEF DESCRIPTION OF THE FIGURES

The accompanying drawings, which are incorporated in and constitute a part of the specification, illustrate an embodiment of the invention and, together with the description, explain the purpose, advantages, and principles of the invention. In the drawings.

DETAILED DESCRIPTION OF THE INVENTION

The following detailed description of the invention refers to the accompanying drawings that illustrate exemplary embodiments consistent with this invention. Other embodiments are possible, and modifications may be made to the embodiments within the spirit and scope of the invention. Therefore, the following detailed description is not meant to limit the invention. Rather, the scope of the invention is defined by the appended claims.

It would be apparent to one of skill in the art that the embodiments, as described below, may be implemented in many different embodiments of hardware, software, firmware, and/or the entities illustrated in the figures. Any actual software code with specialized controlled hardware to implement the present invention is not limiting of the present invention. Thus, the operation and behavior of the present invention will be described with the understanding that modifications and variations of the embodiments are possible, given the level of detail presented herein.

Figure 1:
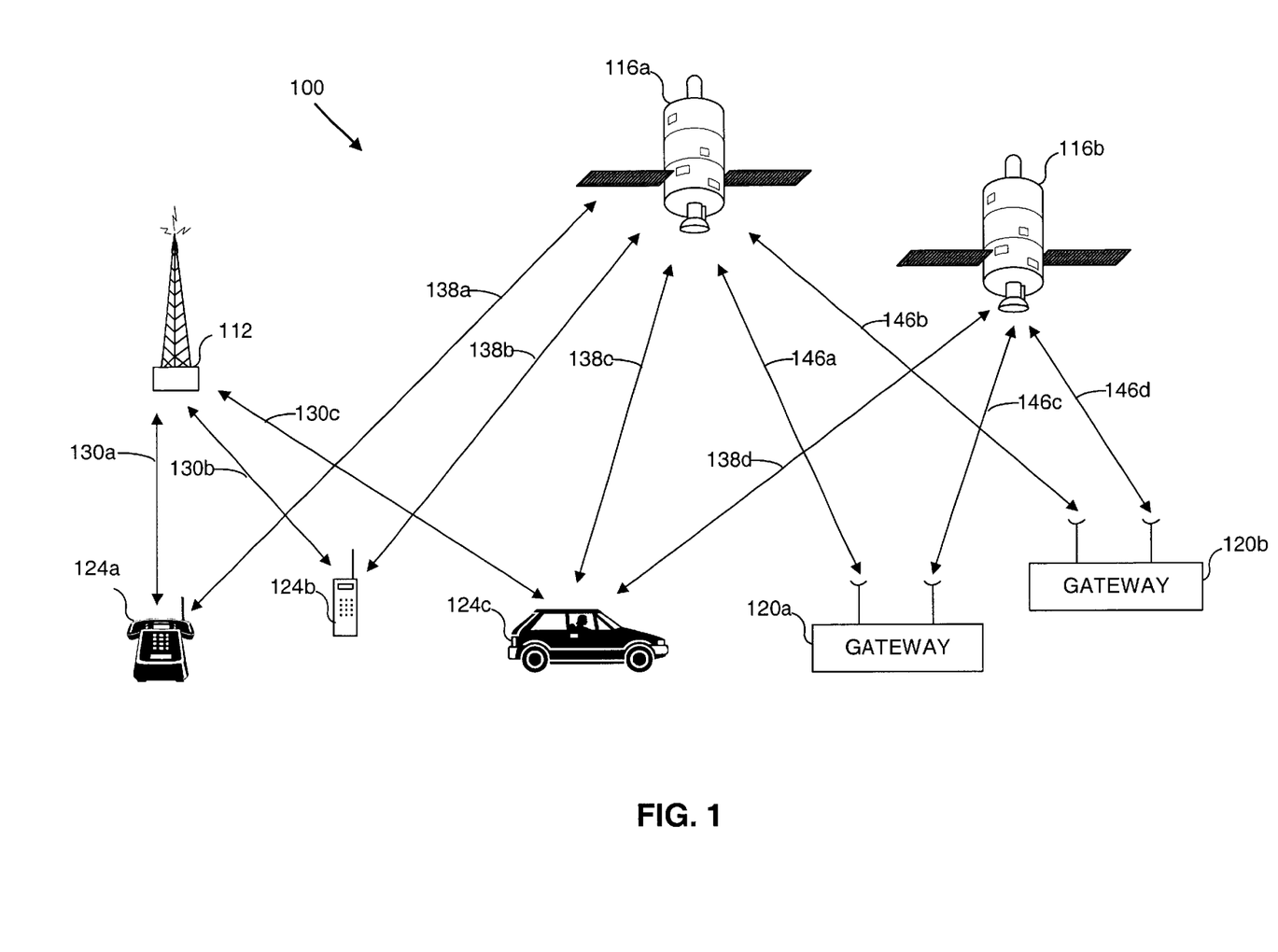
FIG. 1 illustrates an exemplary wireless communication system.

Before describing embodiments of the invention in detail, it is helpful to describe an example environment in which they may be implemented. Embodiments of the invention are particularly useful in mobile communications environments. FIG. 1 illustrates such an environment.

FIG. 1 is a block diagram of an exemplary wireless communication system (WCS) 100 that includes a base station 112, two satellites 116a and 116b, and two associated gateways (also referred to herein as hubs) 120a and 120b. These elements engage in wireless communications with user terminals 124a, 124b, and 124c. Typically, base stations and satellites/gateways are components of distinct terrestrial and satellite based communication systems. However, these distinct systems may interoperate as an overall communications infrastructure.

Base stations 112 may form part of terrestrial based communication systems and networks that include a plurality of PCS/cellular communication cell-sites. Base stations 112 can be associated with a terrestrial based CDMA or TDMA (or hybrid CDMA/TDMA) digital communication system, transmitting or receiving terrestrial CDMA or a TDMA signals to or from a mobile user terminal. The terrestrial signal can be formatted in accordance with IMT-2000/UMT standards (that is, International Mobile Telecommunications System 2000/Universal Mobile Telecommunications System standards). The terrestrial signal can be a wideband CDMA signal (referred to as a WCDMA signal), or a signal conforming to cdma2000 standards (such as cdma2000 1× or 3× standards, for example), or a TD-SCDMA signal. On the other hand, base stations 112 can be associated with an analog based terrestrial communication system (such as AMPS), which transmit and receive analog based communication signals.

Although FIG. 1 illustrates a single base station 112, two satellites 116, and two gateways 120, other numbers of these elements may employed to achieve a desired communications capacity and geographic scope. For example, an exemplary implementation of WCS 100 includes 48 or more satellites, traveling in eight different orbital planes in Low Earth Orbit (LEO) to service a large number of user terminals 124.

The terms base station and gateway are also sometimes used interchangeably, each being a fixed central communication station, with gateways, such as gateways 120, being perceived in the art as highly specialized base stations that direct communications through satellite repeaters while base stations (also sometimes referred to as cell-sites), such as base station 112, use terrestrial antennas to direct communications within surrounding geographical regions.

User terminals 124 each have or comprise apparatus or a wireless communication device such as, but not limited to, a cellular telephone, a wireless handset, a data transceiver, or a paging or position determination receiver. Furthermore each of user terminals 124 can be hand-held, portable as in vehicle mounted (including cars, trucks, boats, trains, and planes) or fixed, as desired. For example, FIG. 1 illustrates user terminal 124*a* as a fixed telephone, user terminal 124*b* as a hand-held portable device, and user terminal 124*c* as a vehicle-mounted device. Wireless communication devices are also sometimes referred to as user terminals, mobile stations, mobile units, subscriber units, mobile radios or radiotelephones, wireless units, or simply as 'users' and 'mobiles' in some communication systems, depending on preference.

User terminals 124 engage in wireless communications with other elements in WCS 100 through CDMA communications systems. However, the present invention may be employed in systems that employ other communications techniques, such as time division multiple access (TDMA), and frequency division multiple access (FDMA) or other waveforms or techniques listed above (WCDMA, CDMA2000 . . . ).

Generally, beams from a beam source, such as base station 112 or satellites 116, cover different geographical areas in predefined patterns. Beams at different frequencies, also referred to as CDM channels or 'sub-beams', can be directed to overlap the same region. It is also readily understood by those skilled in the art that beam coverage or service areas for multiple satellites, or antenna patterns for multiple base stations, might be designed to overlap completely or partially in a given region depending on the communication system design and the type of service being offered, and whether space diversity is being achieved.

FIG. 1 illustrates several exemplary signal paths. For example, communication links 130*a–c* provide for the exchange of signals between base station 112 and user terminals 124. Similarly, communications links 138*a–d* provide for the exchange of signals between satellites 116 and user terminals 124. Communications between satellites 116 and gateways 120 are facilitated by links 146*a–d*.

User terminals 124 are capable of engaging in bi-directional communications with base station 112 and/or satellites 116. As such, communications links 130 and 138 each include a forward link and a reverse link. A forward link conveys information signals to user terminals 124. For terrestrial-based communications in WCS 100, a forward link conveys information signals from base station 112 to a user terminal 124 across a link 130. A satellite-based forward link in the context of WCS 100 conveys information from a gateway 120 to a satellite 116 across a link 146 and from the satellite 116 to a user terminal 124 across a link 138. Thus, terrestrial-based forward links typically involve a single wireless signal path, while satellite-based forward links typically involve two paths or links.

In the context of WCS 100, a reverse link conveys information signals from a user terminal 124 to either a base station 112 or a gateway 120. Similar to forward links in WCS 100, reverse links typically require a single wireless connection for terrestrial-based communications and two wireless connections for satellite-based communications. WCS 100 may feature different communications offerings across these forward links, such as low data rate (LDR) and high data rate (HDR) services. An exemplary LDR service provides forward links having data rates from 3 kilobits per second (kbps) to 9.6 kbps, while an exemplary HDR service supports data rates as high as 604 kbps or more.

HDR service may be bursty in nature. That is, traffic transferred across HDR links may suddenly begin and end in an unpredictable fashion. Thus, in one instant, an HDR link may be operating at zero kbps, and in the next moment operating at a very high data rate, such as 604 kbps.

As described above, WCS 100 performs wireless communications according to CDMA techniques. Thus, signals transmitted across the forward and reverse links of links 130, 138, and 146 convey signals that are encoded, spread, and channelized according to CDMA transmission standards. In addition, block interleaving may be employed across these forward and reverse links. These blocks are transmitted in frames having a predetermined duration, such as 20 milliseconds.

Base station 112, satellites 116, and gateways 120 may adjust the power of the signals that they transmit across the forward links of WCS 100. This power (referred to herein as forward link transmit power) may be varied in response to signals, requests or commands received from user terminal 124, and according to time. This time varying feature may be employed on a frame-by-frame basis. Such power adjustments are performed to maintain forward link bit error rates (BER) within specific requirements, reduce interference, and conserve transmission power.

For example, gateway 120*a*, through satellite 116*a*, may transmit signals to user terminal 124*b* at a different forward link transmission power than it does for user terminal 124*c*. Additionally, gateway 120*a* may vary the transmit power of each of the forward links to user terminals 124*b* and 124*c* for each successive frame.

Figure 2:
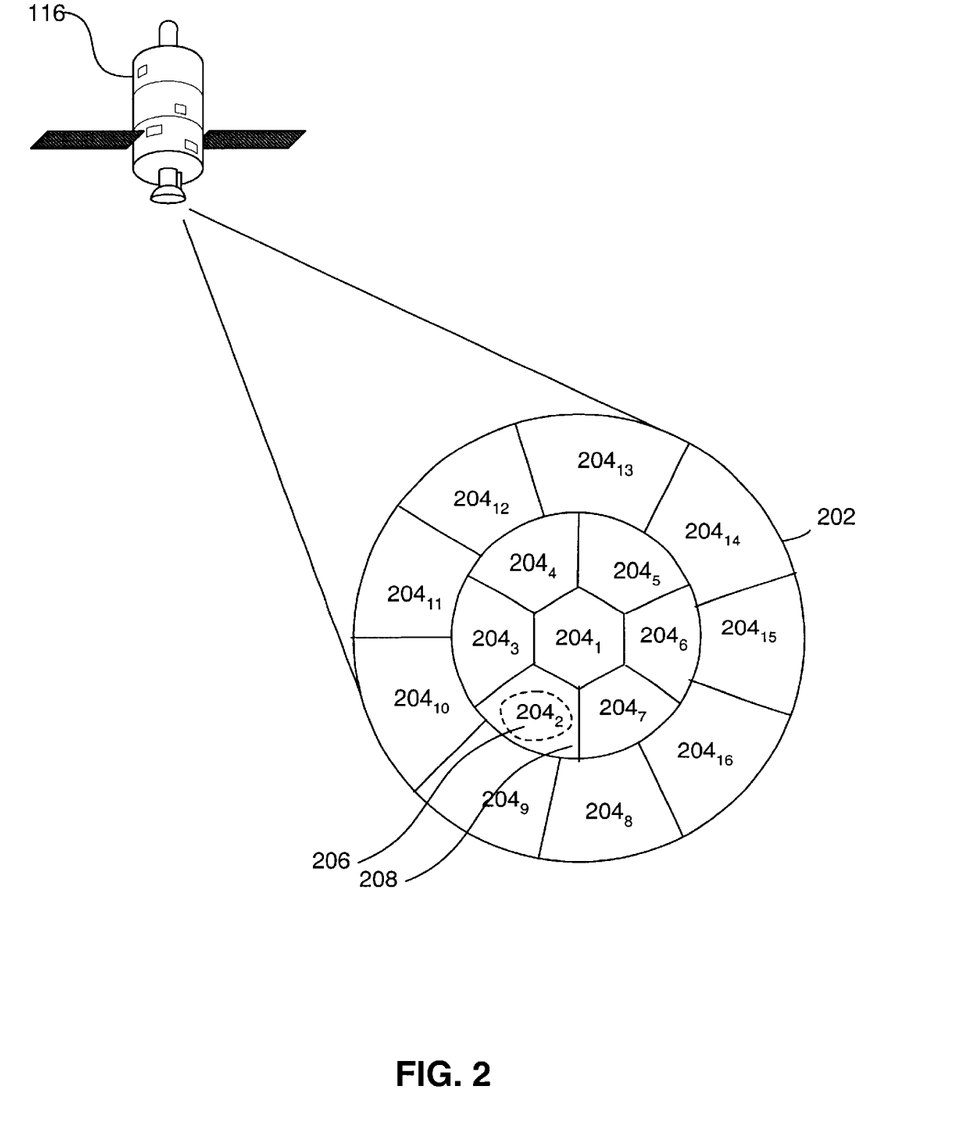
FIG. 2 is a diagram illustrating an exemplary footprint having a plurality of beams.

FIG. 2 illustrates an exemplary satellite beam pattern 202, also known as a footprint. As shown in FIG. 2, the exemplary satellite footprint 202 includes sixteen beams $204_1$–$204_{16}$. Each beam covers a specific geographical area, although there usually is some beam overlap. The satellite footprint shown in FIG. 2 includes an inner beam (beam $204_1$), middle beams (beams $204_2$–$204_7$), and outer beams (beams $204_8$–$204_{16}$). Beam pattern 202 is a configuration of particular predefined gain patterns that are each associated with a particular beam 204.

Beams 204 are illustrated as having non-overlapping geometric shapes for purposes of illustration only. In fact, beams 204 each have gain pattern contours that extend well beyond the idealized boundaries shown in FIG. 2. However, these gain patterns are attenuated beyond these illustrated boundaries such that they do not typically provide significant gain to support communications with user terminals 124 outside of a given "boundary."

Beams 204 may each be considered to have different regions based on their proximity to other beam(s) and/or position within other beam gain pattern(s). For example, FIG. 2 illustrates beam $204_2$ having a central region 206 and a crossover region 208. Crossover region 208 includes portions of beam $204_2$ that are in close proximity to beams $204_1$, $204_3$, $204_7$, $204_8$, $204_9$, and $204_{10}$. Because of this proximity, user terminals 124 within crossover region 208 (as well as similar regions in other beams) are more likely to handoff to an adjacent beam, than are user terminals 124 in central region 206. However, user terminals 124 within handoff probable regions, such as crossover region 208, are also more likely to receive interference from communications links in adjacent beams 204.

Figure 3:
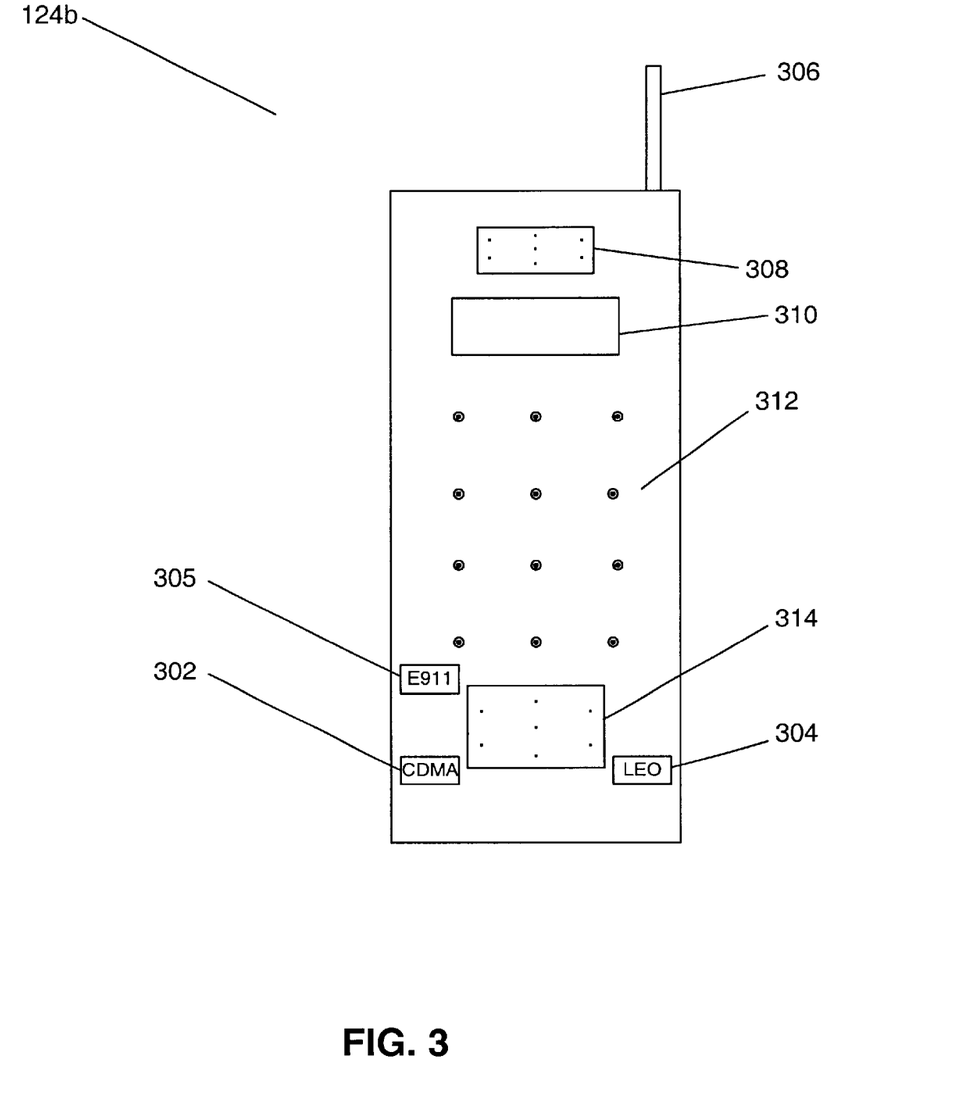
FIG. 3 is an illustration of an exemplary mobile communications terminal.

FIG. 3 is a more detailed illustration of the exemplary mobile phone 124*b* used in the instant invention. As stated above, the mobile phone 124b is a multi-mode or multi-band mobile phone, capable of operating in accordance with a number of wireless communication standards. Although the present application focuses primarily on the applicability of CDMA IS-95 and LEO satellite communications, it is not limited to such standards. Many other air link standards can be accommodated, such as wideband CDMA (W-CDMA), global system for mobile communications (GSM), or other suitable wireless communication standard.

The exemplary mobile phone 124b of FIG. 3 includes an antenna 306 for operating at radio frequency (RF) frequencies compatible with the air link standards associated with the WCS 100. The exemplary mobile phone 124b includes a number of mode select switches 302, 304, and 305 that are used to select between the different air link standards compatible with the mobile phone 124b and the WCS 100. Finally, the exemplary mobile phone 124b may include other standard features, such as an speaker 308, a display panel 310, a keypad 312, and a microphone 314. The mode select switch 302 is used to select, for example, a terrestrial air link communication mode and the mode select switch 304 is used to select a satellite air link communication mode. The mode select switch 305 is used to activate an E911 emergency response mode.

However, those skilled in the art will readily understand that embodiments of the invention are not limited to such manually operated mode selection or emergency response activation. The selection will typically occur as the result of manual device user input in which a particular mode is selected using a switch or a combination of one or more buttons on a wireless device. On the other hand, processing of pre-selected or pre-stored commands or method steps which cause the selection of such a mode based on certain values, parameters, or criteria changing could be used to trigger a mode selection circuit or switch. For example, the detection of an impact or damage to the wireless device, indicating harm to a user, detection of excessive g forces (auto accident), dramatic change in local environmental conditions such as temperature (exposure) for the wireless device, could be used in some wireless devices to activate such an emergency request, or request activation mechanism. Various types of voice or audio signal activation elements or programs may also be used, as desired.

Figure 4:
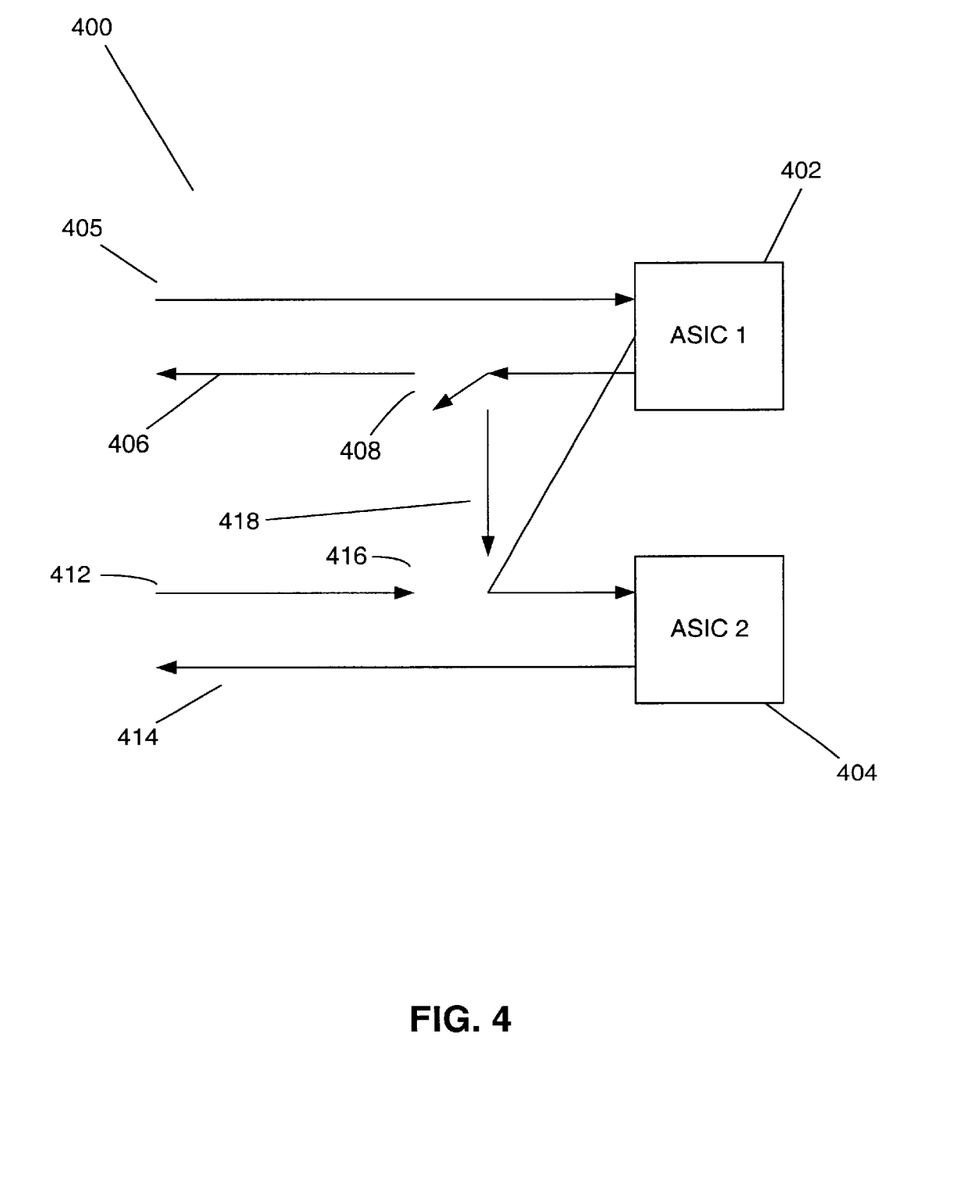
FIG. 4 is a block diagram representation of exemplary ASICs configured for different air link standards.

As stated above, in the United States the FCC requires that mobile phone service providers be able to provide position information within predetermined parameters for all 911 calls placed using mobile phones, such as the mobile phone 124b. In order to satisfy the requirement of providing position information for E911 services, the WCS 100 utilizes information provided in-part by the LEO satellites 116a and 116b. Mobile phone 124b can implement multi-mode functionality, required to process information from both the LEO satellite and GPS satellites, using a variety of signal processing circuits or functional circuit elements, controllers, or modules such as receiver/transmitters, correlators, and modulator/demodulators. Although a single software re-configurable application specific integrated circuit (ASIC), software defined radio (SDR), or a field programmable gate array (FPGA) type radio can be used, FIG. 4 illustrates an embodiment using two different ASICs to accommodate two or more different air link standards selected by the mode switches 302 and 304. A wireless device can use two or more ASICs or sets of circuits or devices, each dedicated to accomplishing a specific task.

FIG. 4 is a block diagram 400 of an exemplary ASIC configuration for use in the mobile phone 124b. In FIG. 4, a first ASIC 402 is used to implement terrestrial air link communications selected by the mode switch 302. The ASIC 402 supports a forward link channel 405 and a reverse link channel 406. The forward link accommodates mobile phone traffic as discussed earlier. The forward link traffic originates at a servicing base station, such as the base station 112, and is transmitted to a receiving user terminal or wireless device, such as the mobile phone 124b. Similarly, the reverse link is used to carry traffic in the direction from mobile phones to base stations. The reverse link 406 also includes a switch 408 for transferring reverse link information, transmitted from the ASIC 402, to other portions of the mobile phone 124b.

The second ASIC 404 is provided to accommodate, for example, the satellite communication mode selected by the mode switch 304 of the mobile phone 124b. The second ASIC 404, also includes a forward link 412 and a reverse link 414. The forward link 412 includes a switch 416 for receiving timing data 418 forwarded from the reverse link 406 of the first ASIC 402. The switch 408 is used as a conduit to interject, insert, or add the timing data 418 directly into the forward link 412 of the second ASIC 404 through the switch 416. The injection of the timing data 408 from the first ASIC 402 provides the second ASIC 404 with the most accurate system timing information, thus permitting the second ASIC 404 to reduce the time and the size of a search hypothesis needed to acquire separate timing information for itself associated with the new airline standard on the forward link 412 once the switch 416 is set to allow acquisition of the new signal.

The need for separate timing information is critical, for example, when a user of the mobile phone 124b, or the communication system or other elements, activates the E911 feature using the mode select switch 305 while communicating using the LEO mode selected using the mode select switch 304. By receiving system timing information 418 from the ASIC 402, the ASIC 404 can reduce the time and increase the accuracy of performing GPS measurements. In other words, the present invention synchronizes the first ASIC 402 and the second ASIC 404 to the same system reference time.

As known in the art, the system reference time is typically derived from "universal time" sources such as, but not limited to, GPS and is used to synchronize the components and operation of communication systems, such as the WCS 100. The advantage of the technique of the present embodiment is greater timing accuracy than could be provided using other techniques, such as an interrupt handshake method. That is, using conventional techniques, the second ASIC 404 would need to first acquire the airline and then derive timing information entirely from the airline signal received on forward link 412, without the benefit of any a priori timing information. This received air link signal is provided when the forward link 412 is switched from an RF source associated with the first ASIC 402 to an RF source associated with the second ASIC 404.

These conventional techniques require a relatively significant amount of overhead time in order to acquire, receive, demodulate, and identify the forward link pilot signal. Still more time is required to demodulate an ensuing sync channel message and then extract appropriate timing information. The technique of this embodiment, however, eliminates the overhead time required to perform these additional processing steps. Although, for example, other techniques may be usable to guess the timing associated with the second ASIC 402, such a guess will never provide the level of accuracy needed to perform the GPS acquisition and measurement as achieved by embodiments of the invention. The operation of the embodiments will be described in greater detail below.

A user activates the E911 feature by actuating the mode switch 305 of the mobile phone 124b. Consequently, the first ASIC 402 will demodulate the forward link signal 405 on the established 911 voice call. At the same time, however, the second ASIC 404 must make a GPS measurement in order to provide position information in support of the E911 emergency response mode. To perform this measurement quickly and correctly, the second ASIC 404 must synchronize itself with the LEO system time that might include, for example, CDMA system time. The second ASIC 404, however, cannot demodulate the LEO signal associated with the first ASIC 402 because forward link signal 405 is at a different RF frequency, as stated above. The timing data must therefore be transferred from the first ASIC 402 to the second ASIC 404 by, in essence, hijacking a signal from the reverse link 406 of the first ASIC 402.

The first ASIC 402 is programmed, for example, to emit the CDMA forward link PN sequence using what is typically referred to as a long-code mask of zero. To facilitate this process, the switch 408 is provided to switch the reverse link 406 out of the first ASIC 402 into the forward link 412 of the second ASIC 404. This can either be done at the signal digital base-band frequency, or after the signal has been converted to analog form. The second ASIC 404 can then search and acquire what it perceives as a genuine forward link pilot signal, which in reality is the hijacked signal 418 from the reverse link 406 of the first ASIC 402.

Next, the second ASIC 404 synchronizes its time with the PN code change (restart at beginning) or roll over of the timing data signal 418. Given known hardware delays, the second ASIC 404 now knows the CDMA system time to within a system frame period, equal to about 26.6 milliseconds, and also to the desired resolution. This process allows the first and second ASICs 402 and 404 to exchange precise timing information as long as they share the same PN sequences. A more detailed view of the processing system 400 is illustrated in FIG. 5 and discussed below.

Figure 5:
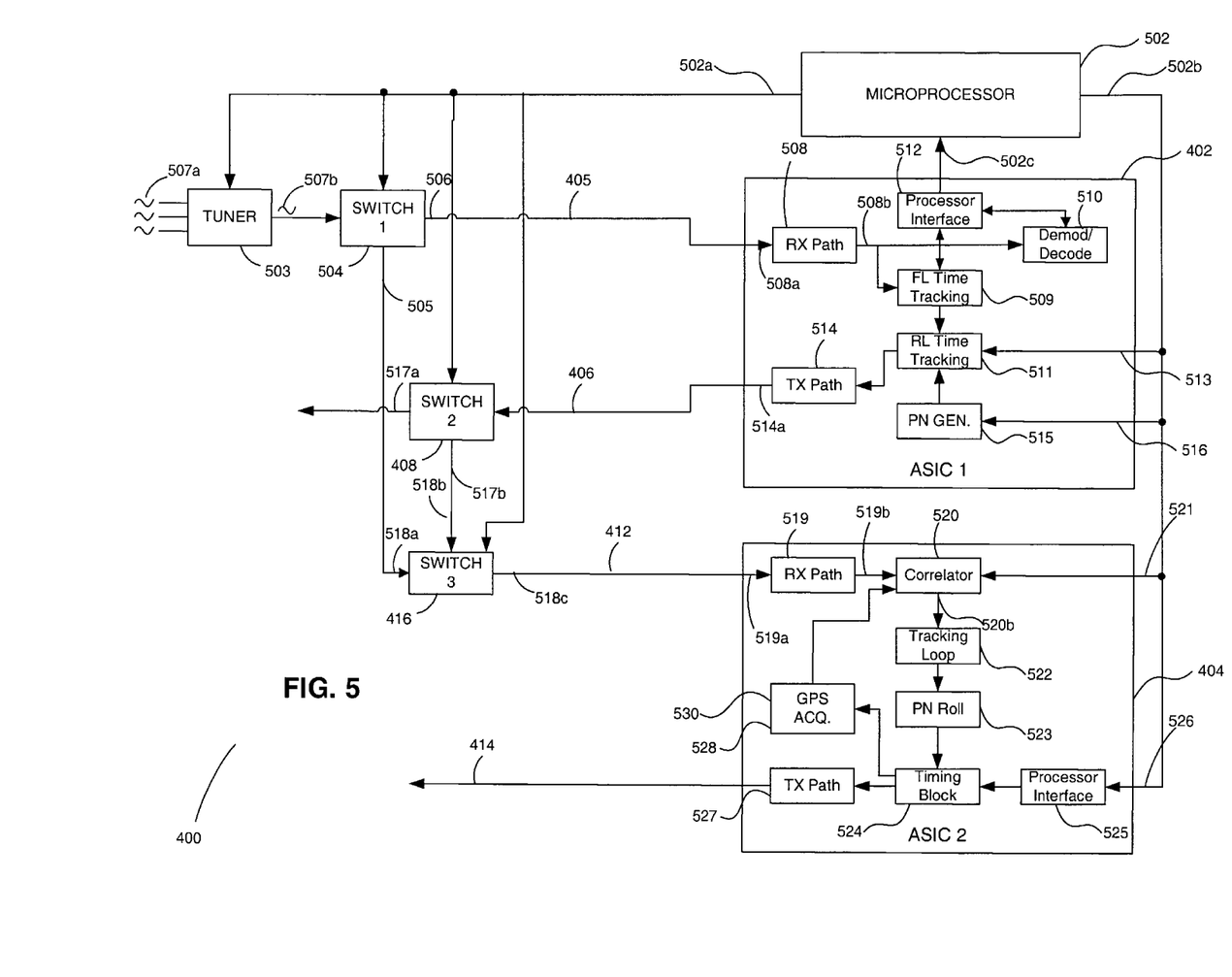
FIG. 5 is a more detailed block diagram illustration of the ASICs shown in FIG. 4.

In FIG. 5, the processing system 400 includes a processor, microprocessor, or controller 502, generally programmable, including first and second output ports 502a and 502b, and an input port 502c. The microprocessor 502 controls operation of the system 400 by providing control signals from the output ports 502a and 502b, in order to synchronize the operations between the first and second ASICs 402 and 404. As shown, the microprocessor 502 is connected to the first and second ASICs 402 and 404, a tuner 503, a switch 504, and the switches 408 and 416 also shown in FIG. 4. Although the mobile phone 124b is compatible with two or more air link standards, it generally employs a single RF signal front-end component.

The tuner 503 scans the RF spectrum in search of signals consistent with the user-selected air link standard. That is, the tuner 503 can tune to a specific frequency in order to receive a desired RF signal 507b from among a plurality of RF signals 507a. The tuner selects the desired RF signal 507b based upon a control signal received from the output port 502a of the processor 502, and provides the desired RF signal 507b to the switch 504. The switch 504 can be implemented using many appropriate switching devices such as a relay or transistor. In the exemplary embodiment of FIG. 5, the switch 504 selectively switches the desired RF signal 507b in accordance with the control signal. Based upon the received control signal, the switch 504 provides the desired RF signal 507b to either one of the two output ports 505 or 506.

In the exemplary processing system 400 of FIG. 5, if the user actuates the terrestrial mode select switch 302 of the mobile phone 124b, the ASIC 402 is activated when the signal 507b is provided to the output port 506 of the switch 504. On the other hand, if the user actuates the satellite mode select switch 304, then the desired signal 507b is provided to the output port 505 of switch 504, and subsequently to the switch 416.

As stated above, the first ASIC 402 in the exemplary processing system 400 is used to accommodate the terrestrial communication mode. While the ASIC 402 includes a number of components required for receiving and processing a terrestrial signal, only those components of the ASIC 402 particularly relevant to the embodiment are illustrated in FIG. 5.

The ASIC 402 includes a receive path 508. The receive path 508, including known components (not shown) such as a receiver, an automatic gain control (AGC) module, and a correlator, is used as a front-end for the ASIC 402. A receive path input port 508a receives the selected frequency signal 507b forwarded using the switch 504. As required by the appropriate terrestrial signaling standard and consistent with the principles of spread spectrum multiple access techniques, Walsh codes, and a short PN polynomial are used for spreading forward-link signals and to distinguish forward link channels from one another. Different base stations use time-shifted versions of the PN sequence to permit mobile stations to select transmissions from different base stations. The forward link consists of up to 64–128 logical channels, or code channels, as known in the art. The pilot channel is generally code channel zero, such as found in terrestrial systems. However, additional pilot channels could be used as desired, such as in satellite systems where more code channels are employed.

As known in the art, and as repeated herein for purposes of clarity, the forward link PN code includes Walsh codes to provide 64 distinct channels for terrestrial systems and up to 128 channels for satellite systems, and a short code chip sequence, which is $2^{15}$ chips long. The short code repeats itself every 26.6 milliseconds and is used in the forward link for spreading. The moment the short code wraps around and begins to repeat itself is called the PN roll or roll over point. On the reverse link channels, short codes and long codes are used for spreading. The long code is about $(2^{42}-1)$ chips in length and repeats itself every 41.4 days.

In the present invention, the receive path 508 receives the PN sequence at the input port 508a. The PN sequence contains the proper phase of the associated pilot signal. The phasing information is forwarded over a receive path output port 508b to a forward link time tracking device 509, and to a demodulator/decoder unit 510. The forward link time tracking device 509 operates in concert with a reverse link time tracking device 511. When configured in this manner, the forward link timing and reverse link timing can be integrated and tied directly together.

The forward link device 509 determines the timing of a boundary of an incoming frame of an input data stream, which includes the PN sequence. That is, the device 509 can determine, for example, that the boundary of incoming frame number (N) passes an antenna connector of the receive path 508, or another specified location in the transfer path, at the same time the frame boundary of frame number (N) of the reverse link passes the same antenna connector, or specified location, as measured by the reverse link time tracking device 511. Thus, the forward link time tracking device 509 and the reverse time tracking device 511 establish synchronization between the forward and reverse link times, at the PN sequence level (timing level one).

As stated above, when the pilot signal has been successfully acquired, the receive path 508 can then receive the sync channel message. The sync channel message is not forwarded to the forward link time tracking device 509. Instead, the sync channel message is forwarded directly to the demodulator/decoder 510 where it can be demodulated and the message informational content decoded. The synch channel message includes, among other things, CDMA system level timing information (timing level two). This system timing information is passed to a microprocessor interface 512 for forwarding to the microprocessor 502 through an input port 502c.

The microprocessor 502 ultimately derives additional timing information, in the form of a synchronization word, from the timing level two information. This derived timing information will be used in downstream or subsequent processing steps that will be discussed in greater detail below. For example, in this embodiment, the processor 502 provides additional timing information to the reverse link time tracking device 511, along a path 513 to provide system level timing data. A PN generator 515 provides a reverse link PN sequence to the reverse link time tracking device 511. At this point, the reverse link PN code timing can be accurately coupled to the forward link PN sequence timing as tracked by the device 509.

PN level timing information and CDMA system level timing information can be shared between the first ASIC 402 and the second ASIC 404. The only prerequisite for the two ASICs to share system-level timing information is that both the first and second ASICs 402 and 404 must use compatible PN sequence formats. In order to satisfy this prerequisite, the PN generator 515 can be programmed to provide a PN sequence consistent with the PN sequence format of the second ASIC 404.

In order to provide compatible PN sequence formats, a control signal is provided from the microprocessor 502 along a connection path 516 to provide instructions for the PN generator 515 regarding the proper PN sequence format required by the second ASIC 404. With this information, the PN generator 515 then generates a PN sequence compatible with the format requirements of the second ASIC 404. As noted above with reference to the exemplary embodiments of FIGS. 4 and 5, the second ASIC 404 is configured to operate in accordance with the satellite system by virtue of the user's actuation of the satellite mode select switch 304. Therefore, the format of the PN sequence of the second ASIC 404 is determined in accordance with satellite signaling standards.

A satellite compatible PN sequence is produced by the PN generator 515 and is mixed with the timing information in the reverse link time tracking device 511 to provide a synchronized PN sequence compatible with the second ASIC 404. This synchronized PN sequence is then provided to a transmit path 514. The transmit path 514 includes components such as a transmitter, inter-leaver, and other base-band and/or IF components. The transmit path 514 provides this synchronized PN sequence using an output port 514a to the second switch 408 along the reverse link 406. The second switch 408 is also coupled to the microprocessor 502 and receives instructions, control signals, or commands, therefrom. The processor 502 is configured to provide a control signal instructing the switch 408 to provide the synchronized PN sequence as an output transmission from an output port 517a. Alternatively, the control signal can instruct the switch 408 to provide the synchronized PN sequence to another output port 517b. When the first ASIC 402 and the second ASIC 404 share timing information, the switch 408 provides the synchronized PN sequence from its output port 517b to the switch 416.

The switch 416 receives an input from the switch 504 through an input port 518a. Additionally, the switch 416 receives the synchronized PN sequence through another input port 518b. A control signal forwarded by the processor 502 instructs the switch 416 whether to select the signal 507b input at the input port 518a or select the PN sequence through the input port 518b. If the second ASIC 404 received the signal 507b as an input, then the second ASIC 404 will be required to independently acquire and derive timing information for use in the manner discussed above.

On the other hand, for the illustrated embodiment, when activated as a result of actuation of the mode switch 305, the third switch 416 receives and forwards the synchronized PN sequence received from the first ASIC 402 through a third switch output port 518c. At the time the 911 emergency call is made from wireless device or mobile phone 124b, for example, the device user can be communicating in a traffic call over the traffic channel in the first ASIC 402. In conventional mobile phones, if the user terminal is communicating over a traffic channel, the user's present traffic call will be interrupted and the second ASIC 404 will be required to synchronize with the satellite system time and perform a GPS measurement. This process can take up to several seconds to accomplish and can terminate the mobile station or wireless device ongoing traffic call.

Using the illustrated embodiment to align the time between the first ASIC 402 and the second ASIC 402, however, reduces the amount of time required to perform the GPS measurements and increases the accuracy of the measurements. Although the present invention is discussed in terms of the GPS signal, other air link standards may be used to acquire signals.

As also indicated in FIG. 5, the second ASIC 404 includes a receive path 519 and a correlator 520. The receive path 519 is similar in construction and functionality to the receive path 508 of the first ASIC 402 and includes an input port 519a and an output port 519b. When the second ASIC 404 is required to make a timing measurement, the reverse link of the first ASIC 402 is injected into the forward link of the second ASIC 404 through the input port 519a. At this point, for example, instead of receiving a normal PN sequence input to the input port 519a and subsequently searching for system time, the receive path can now utilize the PN sequence and timing information derived by the first ASIC 402.

This PN sequence is forwarded through the output port 519b to the correlator 520. The correlator 520 searches or correlates the PN sequence with a local sequence to determine its associated timing offset. In the present exemplary embodiment, the correlator 520 receives a control signal from the processor 502 along a receive path 521, instructing the correlator not to demodulate or decode the synchronization channel. Once the correlator detects the presence of a PN sequence and determines the timing offset, it forwards the PN sequence and the offset from an output port 520b to a tracking loop 522. The tracking loop 522 monitors the PN sequence to determine the PN roll. Once the PN roll is detected, a detection signal is forwarded to a PN roll generator 523. A PN roll generator 523 produces a PN roll high signal in response to the detected PN roll.

When the processor 502 receives the synchronization word from the microprocessor interface 512, as discussed above, derived timing information, based upon the synchronization word is also forwarded to a timing block 524 by a microprocessor interface 525. In order to account for processing and path delays, however, the processor 502 uses a timing technique wherein the derived synchronization word is forwarded to the timing block 524 in a manner which compensates for the greatest experienced path delay between the processor 502 and the processor interface 525.

When executing the timing technique, the processor 502, in essence informs timing block 524 that in (X) number of frame sequences, the system time will be (Y). The timing block 524 also receives the PN roll high signal from the PN roll generator 523. Thus, the timing block 524, receiving the PN roll high signal from the PN roll generator 523 and the timing technique time tag through the interface 525, can accurately determine the correct system time in the ASIC 404. The system time can be determined to within the desired accuracy of resolution. This accurate system time is then forwarded along a transmit path 527 or to a GPS acquisition device 528. The GPS acquisition device 528 is configured to receive GPS signals and perform the GPS measurements.

For purposes of illustration, the GPS acquisition device 528 can now use this timing information to reduce the number of search spaces or the size of the timing window of the timing hypothesis required to acquire the GPS signal. Therefore, by using the invention, the mobile station 124*b* can reduce the amount of time required to acquire a second timing signal such as the GPS signal, by reducing the overhead and the number of search trials required to acquire such a signal.

Figure 6:
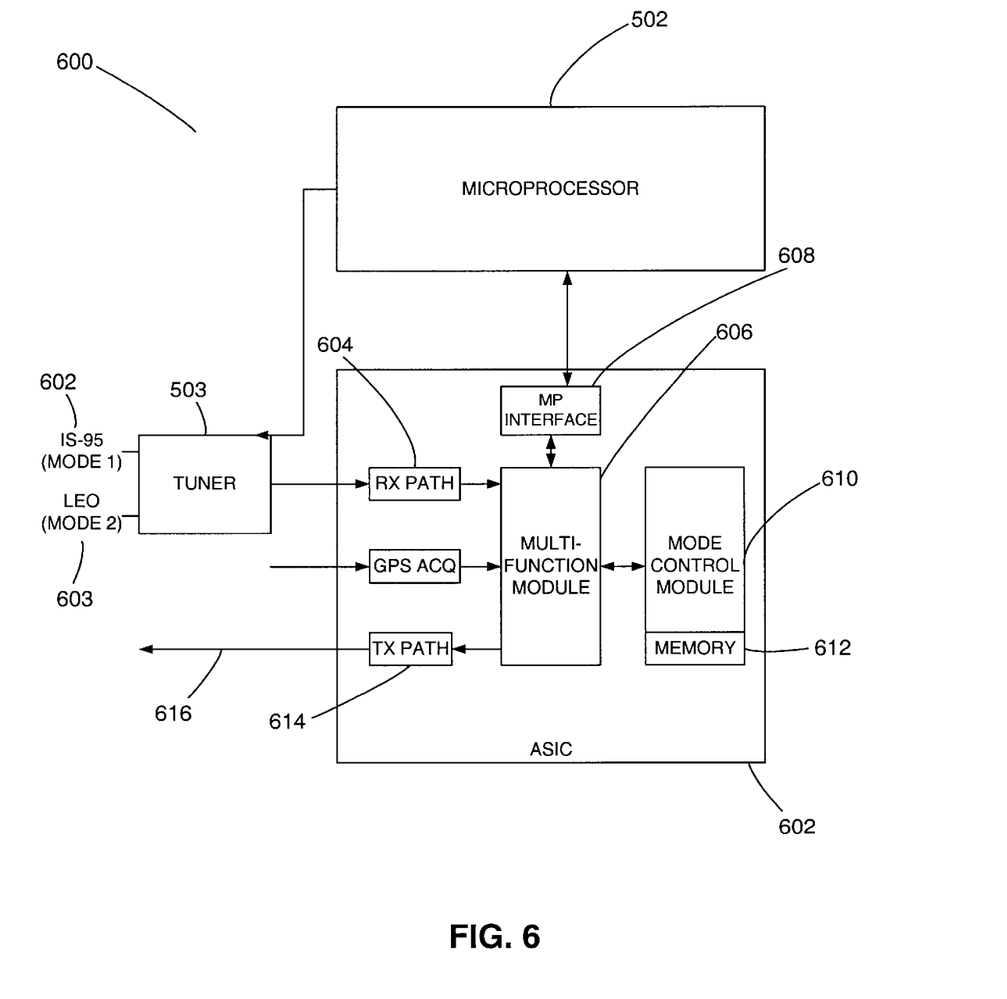
FIG. 6 is a block diagram of a single ASIC configured to operate in accordance with embodiments of the invention.

FIG. 6 illustrates another exemplary embodiment using a single, re-configurable multi-mode ASIC 601. In FIG. 6, a processing system 600 includes the processor 502 and the tuner 503 shown in FIG. 5. For purposes of illustration only, the tuner 503 in FIG. 6 is shown to operate between a first mode 602 associated with an IS-95 air link standard and a second mode 603 associated with a W-CDMA air link standard. The control signal provided by the processor 502 instructs the tuner 503 regarding which RF signal to tune to. For example, in the first mode 602, the tuner 503 is configured to receive an RF signal associated with an IS-95 air link standard. The received IS-95 RF signal is forwarded to a receive path 604. Here, the signal formats and internal processing are similar to those discussed with reference to FIG. 5. In the system 600, however, the internal processing is determined based upon a particular mode selected within the ASIC 602.

A multi-function module 606 includes implementations of the forward and reverse link tracking devices, the decoder, and the PN generator associated with the first ASIC 402 shown in FIG. 5. The module 606 also includes implementations of the correlator tracking loop, and PN roll signal high devices associated with the second ASIC 404 of FIG. 5. A software-driven mode control module 610 configures the ASIC 602, based upon a user's input for selection of an operational mode consistent with IS-95.

In this operational mode, all timing and signaling information associated with the IS-95 first mode 602 is stored in a memory 612. A transmit path 614 connected with the multi-function module 606 is provided to transmit communications and signaling data along a reverse link 616. In the this embodiment, however, when the user desires to make a 911 emergency call, the ASIC 602 is reconfigured by the mode control module 610 to search for and acquire a GPS signal using a GPS acquisition module 618. In this case, as discussed above with reference to the first ASIC 402, all of the timing and synchronization information stored in the memory 610 may be retrieved and used in association with the GPS signal search as instructed by the mode control module 610. Thus, the size of the search window and the time required to acquire the GPS signal can be reduced.

Figure 7:
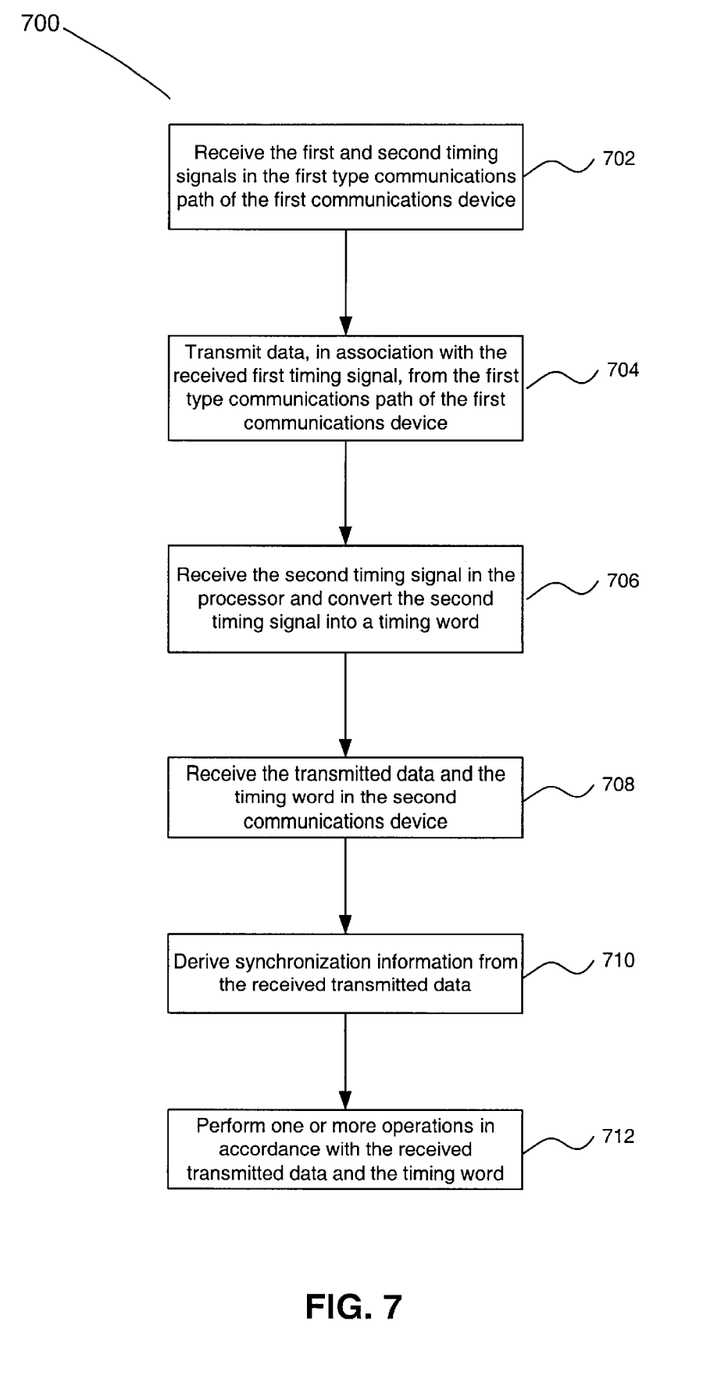
FIG. 7 is an exemplary method of practicing embodiments of the invention.

FIG. 7 illustrates an exemplary method 700 of injecting, or transferring, reverse link timing information from a first ASIC into the forward link of a second ASIC in accordance with the present invention. In a processing step 702, timing signals associated with the CDMA pilot channel and the CDMA synchronization channel are received in the forward link of the first ASIC 402. In a processing step 704, associated PN level sequence data is transmitted over the transmit path 514 in association with the received forward link PN timing. The PN sequence data is transmitted along the reverse link 406 of the transmit path 514. Synchronization data is derived from an associated synchronization message over or from the sync channel.

The derived synchronization data is received in the processor 502 and converted to a timing word for forwarding and further processing, as indicated in step 706. In step 708, the transmitted data and the timing word are received within the second ASIC 404, wherein synchronization information is derived from the received transmitted data, as indicated in step 710. One or more operations, such as acquisition of a GPS signal may be carried out in accordance with the received the timing word data, as indicated in step 712.

By using the techniques of these embodiments, multiple ASICs may share system time to enable a faster acquisition of timing signals associated with different air link standards. By using this technique, the time for acquiring these signals and making GPS measurements can be reduced from seconds to milliseconds. Consequently, call dropping during E911 operation or intersystem handoff can be minimized.

The foregoing description of the preferred embodiments provides an illustration and description, but is not intended to be exhaustive or to limit the invention to the precise form disclosed. Modifications and variations are possible consistent with the above teachings, or may be acquired from practice of the invention.

What we claim as out invention is:

1. Apparatus comprising:
   a first communications device comprising at least first and second types of communication paths, being configured to receive first and second timing signals in the first type communication path and to transmit data on the second type communication path, the data being transmitted in association with a received first timing signal;
   a processor coupled to the first communications device configured to receive the second timing signal and produce a timing word from a second timing signal; and
   a second communications device comprising at least the first type communication path, being coupled to the processor and configured to receive the timing word, receive the transmitted data and derive synchronization information therefrom, the synchronization information being related to the first timing signal, and to perform one or more operations in accordance with the received second timing signal and the derived synchronization information.

2. The apparatus of claim 1, wherein the first type communication path comprises a forward link and the second type communication path comprises a reverse link.

3. The apparatus of claim 1, wherein the first and second timing signals respectively comprise a pilot signal and a synchronization channel message signal.

4. The apparatus of claim 1, wherein the first and second communications devices respectively comprise first and second application specific integrated circuits.

5. The apparatus of claim 1, wherein the one or more operations comprise at least deriving timing information associated with the second communications device.

6. The apparatus of claim 1, wherein the received timing word comprises adjustments to compensate for path delays.

7. Apparatus comprising:
   a first communications device including at least first and second types of communication paths which are configured to receive first and second timing signals over the first type communication path and transmit data on the second type communication path, the data being transmitted in association with a received first timing signal;
   a processor electrically coupled to the first communications device and configured to receive the second timing signal and to produce a timing word from a second timing signal; and
   a second communications device including at least the first type communication path, being coupled to the processor and configured to receive the timing word therefrom, to receive the transmitted data and derive synchronization information therefrom, the synchronization information being related to the first timing signal, and to acquire one or more communications signals in accordance with the received second timing signal and the derived synchronization information.

8. The apparatus of claim 7, wherein the first type communication path comprises a forward link and the second type communication path comprises a reverse link.

9. The apparatus of claim 7, wherein the first and second timing signals respectively comprise a pilot signal and a synchronization channel message signal.

10. The apparatus of claim 7, wherein the first and second communications devices respectively comprise first and second application specific integrated circuits.

11. The apparatus of claim 7, wherein the one or more communications signals comprise at least a timing signal associated with a positioning satellite network.

12. The apparatus of claim 7, wherein the received timing word comprises adjustments to compensate for path delays.

13. Apparatus comprising:
a processor;
a tuner coupled to the processor configured to receive a number of radio frequency signals based upon a first processor control signal, the tuner producing a selected frequency signal as an output;
a first switch coupled to the processor having two or more first switch output ports, and being configured to receive a second processor control signal, to receive the selected frequency signal from the tuner, and to selectively switch the received selected frequency signal between the two or more first switch output ports;
a first circuit coupled to the microprocessor, the tuner, and the first switch comprising:
a first receive path having an input port coupled to a first of the two or more first switch output ports, configured to receive the selected frequency signal through the input port, the received selected frequency signal comprising a first type timing component and a synchronization word, the synchronization word being output to the processor, the processor producing a second type timing component in response thereto,
a time tracking device configured to receive the first and second timing components, to perform a first synchronization operation in response to the received first and second timing components, and to produce a synchronization point in accordance with the first synchronization operation,
a code generator coupled to the processor configured to receive a communications message therefrom, and to generate a data sequence in accordance with the communications message and to provide the data sequence to the time tracking device which produces a correlated data sequence based upon the synchronization point and the communications message, and
a first transmit path configured to receive the correlated data sequence and produce a synchronized data stream therefrom, being configured to transmit the synchronized data stream using a first transmit path output port;
a second switch electrically coupled to the processor and to the first transmit path output port, comprising two or more second switch output ports and being configured to receive a third processor control signal, to receive the synchronized data stream, and to selectively switch the received synchronized data stream between the two or more second switch output ports;
a third switch comprising first and second third switch input ports and an output port, wherein the first third switch input port is coupled to the second of the two or more first switch output ports and the second third switch input port is coupled to one of the second switch output ports, the third switch being configured to receive a fourth processor control signal, to receive the selected frequency signal using the first third switch input port, and to receive the synchronized data stream using the second third switch input port;
a second circuit coupled to the processor and the third switch comprising:
a second receive path having an input coupled to the third switch output port being configured to receive a selected one of the synchronized data stream and the selected frequency signal from the input port, and
a correlator coupled to an output of the second receive path and configured to detect the presence of the synchronized data stream when the synchronized data stream is received in the second receive path, the correlator providing, the synchronized data stream as an output; and
a time measurement mechanism having a first input coupled to an output of the correlator and another input coupled to the microprocessor, the time measurement mechanism being configured to receive the synchronized data stream from the correlator, to receive the synchronization word from the processor, and to derive a timing window therefrom.

14. The apparatus of claim 13, wherein the first type timing component comprises pseudorandom noise level timing information.

15. The apparatus of claim 13, wherein the first and second receive paths comprise a forward link.

16. The apparatus of claim 13, wherein the first transmit path comprise a reverse link.

17. A method for acquiring a timing signal in a system including a first communications device including at least first and second type communications path, a second communications device including at least a first type communications path, and a processor, comprising the steps of:
receiving first and second timing signals in the first type communications path of the first communications device;
transmitting data from the second type communications path of the first communications device, the data being transmitted in association with the received first timing signal;
receiving the second timing signal in the processor and converting the second timing signal into a timing word;
receiving in the second communications device (i) the transmitted data and deriving synchronization information therefrom and (ii) the timing word; and
performing one or more operations in accordance with the received transmitted data and the timing word.

18. The method of claim 17, wherein the first and second timing signals respectively comprise a pilot signal and a synchronization channel message.

19. The method of claim 17, wherein the first type communication path comprises a forward link and the second type communication path includes a reverse link.

20. The method of claim 17, wherein the data comprises a synchronization timing word.

21. Apparatus comprising:
a communication device configured to operate in first and second air link modes;

at least first and second type communication paths adapted for facilitating communication with the communication device at least during of the first air link mode;

wherein the communication device is configured to (i) receive first and second timing signals on the first type communication path, first and second timing signal data respectively representative of the first and second timing signals being stored in a communication device memory, and (ii) transmit communication data on the second type communication path, the communication data being transmitted in accordance with the first timing signal data;

wherein the second air link mode includes at least a first type communication path configured for facilitating communication with the communication device during operation of the second air link mode;

wherein the first type communication path of the second air link mode is configured to receive the transmitted communication data and produce first type synchronization information therefrom;

a timing mechanism configured for activation during the second air link mode and to receive the first type synchronization information; and a processor coupled to the communication device and configured to receive the second timing signal data stored in the memory and produce second type synchronization information therefrom, the processor providing the second type synchronization information to the timing mechanism during the activation.

22. The apparatus of claim 21, wherein the first and second air link modes comprise compatibility with at least one of a satellite, CDMA, W-CDMA, and GSM based wireless communication system.

* * * * *